(12) United States Patent
Mailänder

(10) Patent No.: US 6,279,320 B1
(45) Date of Patent: Aug. 28, 2001

(54) TURBOCHARGING DEVICE FOR AN INTERNAL COMBUSTION ENGINE

(75) Inventor: Udo Mailänder, Bietigheim-Bissingen (DE)

(73) Assignee: Udo Mailänder GmbH (DE)

( * ) Notice: Subject to any disclaimer, the term of this patent is extended or adjusted under 35 U.S.C. 154(b) by 0 days.

(21) Appl. No.: 09/459,181

(22) Filed: Dec. 10, 1999

(30) Foreign Application Priority Data

Dec. 10, 1998 (DE) .............................................. 198 56 960

(51) Int. Cl.⁷ .................................................. F02B 37/013
(52) U.S. Cl. .............................................................. 60/612
(58) Field of Search .................................................. 60/612

(56) References Cited

U.S. PATENT DOCUMENTS

| | | | |
|---|---|---|---|
| 4,228,655 | * | 10/1980 | Herschmann et al. .................. 60/612 |
| 5,899,070 | * | 5/1999 | Droessler et al. ...................... 60/612 |

FOREIGN PATENT DOCUMENTS

| | | | |
|---|---|---|---|
| 639727A5 | | 11/1983 | (CH) . |
| 409619 | * | 2/1925 | (DE) ....................................... 60/612 |
| 2818447 | * | 11/1979 | (DE) ....................................... 60/612 |
| 2855551A1 | | 7/1980 | (DE) . |
| 29723421U1 | | 11/1998 | (DE) . |
| 647550 | * | 12/1950 | (GB) ....................................... 60/612 |

\* cited by examiner

Primary Examiner—Michael Koczo

(74) Attorney, Agent, or Firm—Robert Becker & Assoc.

(57) ABSTRACT

A turbocharging device for an internal combustion engine has an exhaust gas manifold receiving exhaust gas from an internal combustion engine and a first charge air distributor distributing charge air to the internal combustion engine. A first set of exhaust gas turbochargers each has a turbine and a compressor, wherein the turbines of the exhaust gas turbochargers of the first set are connected in parallel to the exhaust gas manifold and the respective compressors are connected serially to the first charge air distributor. A second set of exhaust gas turbochargers with a turbine and a compressor is provided wherein the turbines of the exhaust gas turbochargers of the second set are connected in parallel to the exhaust gas manifold and the respective compressors are connected serially to the first charge air distributor. A first exhaust gas turbocharger of the first set is operated alone when the need for charge air is minimal, and a second exhaust gas turbocharger of the first set is switched on when the need for charge air increases. The air volume of the respective second exhaust gas turbocharger of the first and the second sets is greater than the air volume of the first exhaust gas turbocharger of the first and second sets. The respective compressor of the first exhaust gas turbocharger of the first and second sets is positioned between the compressor of the second exhaust gas turbocharger of the first and second sets and the first charge air distributor. The charge air distributor has a charge air separation flap for dividing in a closed position the interior of the charge air distributor into a first and a second interior portion, wherein the compressor of the first exhaust gas turbocharger of the second set is connected to the second interior portion of the charge air distributor.

10 Claims, 1 Drawing Sheet

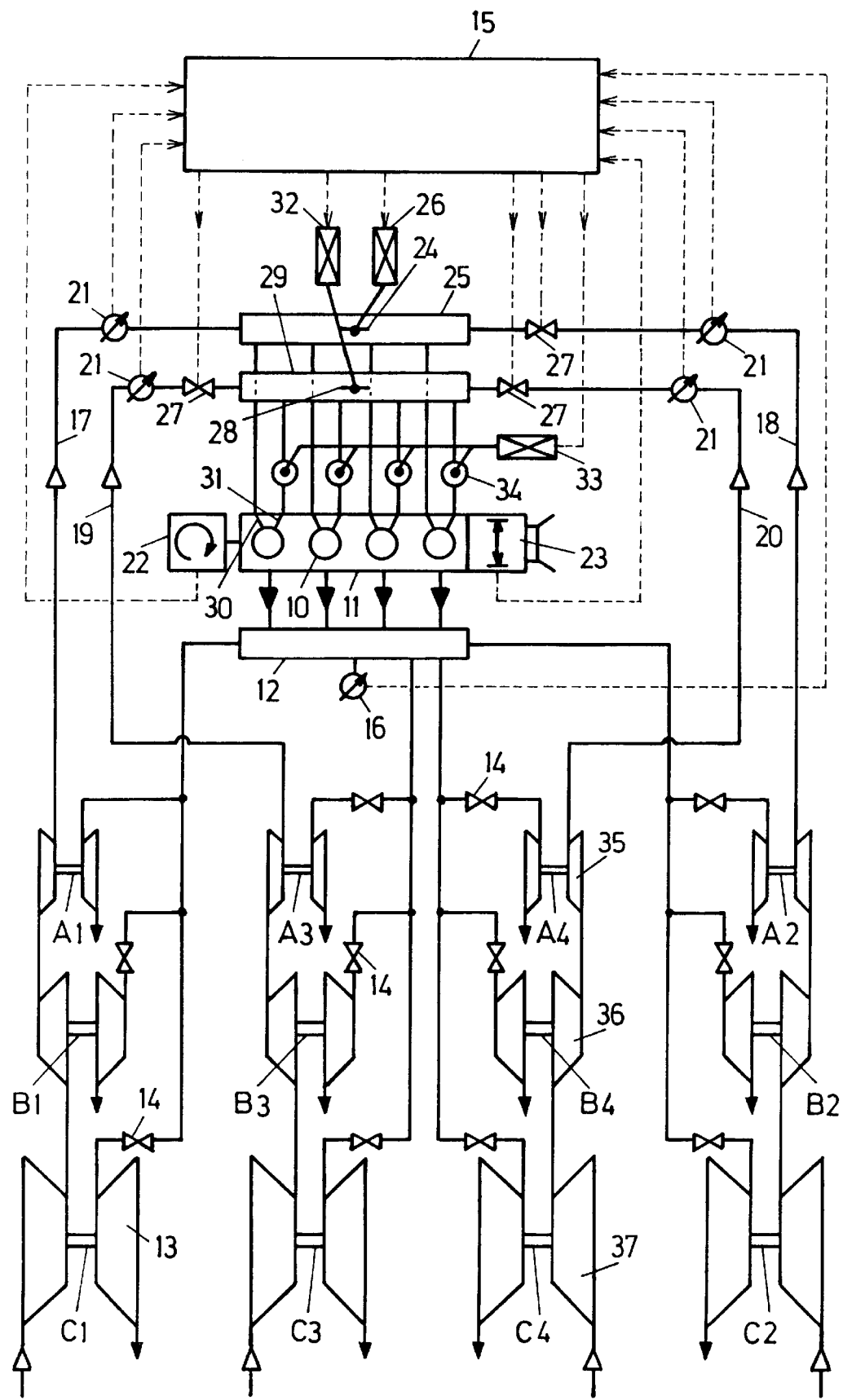

TURBOCHARGING DEVICE FOR AN INTERNAL COMBUSTION ENGINE

BACKGROUND OF THE INVENTION

The present invention relates to a device for turbocharging an internal combustion engine wherein the compressors of two exhaust gas turbochargers are connected serially to a charge air distributor which is common to all cylinders of the internal combustion engine and wherein the turbines are connected parallel to one another to the exhaust gas manifold of the internal combustion engine. The two exhaust gas turbochargers can be switched sequentially. The compressor of the exhaust gas turbocharger which operates alone when only a minimal charge air volume is needed is arranged between the charge air distributor and the compressor of the second exhaust gas turbocharger that is capable of transporting a larger air volume than the first exhaust gas turbocharger.

By means of turbocharging, small size internal combustion engines can be provided with increased output matching that of a substantially larger internal combustion engine. In the case of a preset output, the engine can be reduced in size when turbocharging is employed. Turbocharging of internal combustion engines with exhaust gas turbochargers, however, entails the problem that, on the one hand, the turbocharging results in an increase of the output, but, on the other hand, the geometric mechanical compression must be reduced proportional to the desired output. The reduction of the geometric mechanical compression, however, results in the output, respectively, the torque of the turbocharged internal combustion engine to drop at lower rpm ranges more than proportionally which is a result of the peak-shaped output curves of turbocharged engines within their own operational rpm diagram. A turbo engine can provide an optimal flow and thus a high output only within a very narrow rpm range. However, this is contrary to what is desired for internal combustion engines of land vehicles for representing a pulling force hyperbola. When employing several exhaust gas turbochargers, it is possible to divide the operational rpm range of the internal combustion engine as well as the specific volumetric working size of the exhaust gas turbochargers. The switching on of exhaust gas turbochargers in a time, sequence, however may cause the turbocharging system to reach the range of pumping which results in the collapse of the charge air flow in the newly switched-on compressor when, for example, the air, flowing from the second compressor with minimal pressure first via a relief valve into the atmosphere, enters the charge air distributor of the internal combustion engine which operates already under full pressure of the first compressor. In this scenario the air has to flow from the turbo engine with relatively great flow velocity and minimal pressure building capability to a piston engine with relatively small flow velocity and relatively high pressure building capability.

A turbocharging device described in German Patent Document 297 23 421 has the unique feature that the compressor of the greater exhaust gas turbocharger has arranged downstream thereof a third compressor of a third exhaust gas turbocharger that is connected serially to the other compressors. The third exhaust gas turbocharger comprises a turbine provided with its own bypass valve for connecting the turbine in parallel to the first turbine to the exhaust gas manifold, wherein the air volume to be conveyed by the third turbocharger is greater than that of the larger one of the two other exhaust gas turbochargers. In this way, the output increase of the internal combustion engine also results in lowered fuel consumption and reduced pollutant emission, improved acceleration behavior at low rpm, and a harmonic transition of the operational spectrum from very low rpm at partial load and full load to high rpm at partial load and full load. Only the smallest one of the compressors conveys charge air constantly in this arrangement of three serially connected compressors. In the two larger compressors, which are positioned remote from the engine, the pressure is essentially increased in order to force the charge air required within higher operational ranges of the internal combustion engine without interruption through the limited cross-section of the already fully loaded smallest compressor adjacent to the engine. The pressure drop, occurring after passing of the charge air through the smallest compressor, to the pressure ratio produced by this first smallest compressor results in a considerable temperature reduction which can be used for an advantageous increase of the geometric mechanical compression in the cylinders of the internal combustion engine. In practice, it is impractical because of the different sizes of the exhaust gas turbochargers to introduce into the serial compressor arrangement an additional compressor of a fourth exhaust gas turbocharger. A finer division of the operational spectrum of the internal combustion engine by a stepped operation of more than three exhaust gas turbochargers without disruptive pumping effect requires further measures.

It is therefore an object of the present invention to lower for a turbocharged internal combustion engine the fuel consumption and the pollutant emission, to improve the acceleration behavior at low rpm ranges, to provide a harmonic transition of the operational spectrum from very low rpm at partial load and full load to higher rpm at partial load and full load in connection with an output increase and to realize a stepped on and off switching of a larger number of exhaust gas turbochargers without disruptive pumping effects.

SUMMARY OF THE INVENTION

This object is inventively solved for a device of the aforementioned kind such that, for a finer stepped supply of the charge air to the internal combustion engine, an identical pair configuration of two further exhaust gas turbochargers is correlated with an interior portion of the charge air distributor which can be separated from the interior of the charge air distributor by a charge air separating flap.

The transition from one pair configuration of two exhaust gas turbo chargers to two such pair configurations provides not more and not fewer than two charge air flows which are not combined in the charge air distributor but are separated from one another on their path to the inlet valves of the cylinders of the internal combustion engine. In this configuration, none of the cylinders of the internal combustion engine is exempted from charge air supply for the purpose of improved cold start properties. Because of the separation of the charge air flows, the charge air pressure in the newly switched-on pair configuration of two exhaust gas turbochargers can develop without disruption because of the already established charge air pressure of the previously operated pair configuration. Within each pair configuration of two exhaust gas turbochargers a pumping effect or even a collapse of the charge air flow because of the sequential switching on and switching off of an exhaust gas turbocharger is prevented in that the small compressor positioned in the vicinity of the engine, which is first operated alone, will take in its air through the greater compressor that is serially connected upstream thereof, and this greater compressor will force additional charge air through the smaller compressor upon being switched on. This illustrates why the above mentioned pair configuration of two exhaust gas turbochargers is used for the inventive solution. The advantages to be achieved with the invention reside also especially in that more than three exhaust gas turbochargers can be used in a sequential activation without disruptive pumping effect for a fine division of the operational spectrum of the internal combustion engine. This results in a smoothing of the curve of the conveyed charge air as a function of the rpm of the internal combustion engine and in a switching pressure reduction for an automatic transmission of a vehicle. In this context, the inventive turbocharged device allows expansion from four to six exhaust gas turbochargers wherein in each one of the serial compressor arrangements the compressor of the greater exhaust gas turbocharger has a third compressor of an exhaust gas turbocharger arranged upstream of the larger one of the two exhaust gas turbochargers. Its turbine is connected parallel to the turbines of the other two exhaust gas turbochargers. The third exhaust gas turbocharger is larger with respect to the conveyed air volume in comparison to the other two exhaust gas turbochargers.

A different approach for expansion of the inventive turbocharging device from four to eight exhaust gas turbochargers is realized by providing a second charge air distributor with a charge air separation flap for dividing the interior of the second charge air distributor. This second charge air distributor has connected thereto a configuration of four additional exhaust gas turbochargers arranged identically to the aforementioned combination of four exhaust gas turbochargers. The second charge air distributor is connected to inlet valves of the cylinder of the internal combustion engine that are separate from the inlet valves for the first charge air distributor. In this embodiment the number of separate charge air flows to the inlet valves of the internal combustion engine is doubled from two to four. Possibly remaining smaller charge air losses via the individual cylinders of the internal combustion engine can be counteracted by shutoff valves arranged at the second inlet valves, wherein the shutoff valves are actuated by an actuating device coupled to the switching function of the turbochargers or can be counteracted by correspondingly adapted inlet valves. Preferably, the control unit for sequentially switching the charge air supply of the internal combustion engine is designed such that opening of the exhaust gas switch valve of the last exhaust gas turbocharger of the configuration of the first four exhaust gas turbochargers is performed before the second charge air distributor is activated. In this way, the operational spectrum of the internal combustion engine is already divided in a simple manner into eight sequential operational ranges, and this takes into consideration the advantages for the serially connected compressors of different sizes for a relative increase of the geometric mechanical compression in the cylinders of the internal combustion engine.

BRIEF DESCRIPTION OF THE DRAWING

The object and advantages of the present invention will now appear more clearly from the following specification in conjunction with the accompanying drawing showing the preferred embodiment of the present invention in a schematic representation.

DESCRIPTION OF PREFERRED EMBODIMENTS

The present invention will now be described in detail with the aid of the only FIGURE.

The only drawing shows the embodiment of the inventive turbocharging device in connection with an internal combustion engine embodied as a four cylinder engine. The exhaust gas of the four cylinders 10 of this internal combustion engine is represented by dark arrows and is guided first into the exhaust gas manifold 12 and from there, during the highest operational range of the internal combustion engine 11, to the twelve turbines 13 connected parallel to the exhaust gas manifold 12. The turbines 13 are parts of the twelve exhaust gas turbochargers A1 through A4, B1 through B4, and C1 through C4. While the turbine 13 of the exhaust gas turbocharger A1 is in communication with the exhaust gas manifold 12 at all times, the other exhaust gas turbochargers A2 through A4, B1 through B4, and C1 through C4 have turbines 13 each connected by an exhaust gas switch valve 14 to the exhaust gas manifold 12.

A respective signal line, not shown in the drawing, extends from the exhaust gas switch valves 14 to the control unit 15 for sequentially switching the charge air supply of the internal combustion engine 11. The control unit 15 provided for the sequential switching of the charge air supply of the internal combustion engine 11 comprises a computer which compares measured values of the exhaust gas pressure and/or of the charge air pressure and/or of the rpm of the internal combustion engine 11 and/or of the load requirements of the internal combustion engine 11 with digitally stored switching profiles. In this way, pressure values can be easily combined with rpm values and load requirements for generating switching signals, and switching signals proper for a current operational condition can be provided by combining two or more parameters. Furthermore, the computer contained in the control unit 15 can provide in a simple manner two or more different divisions of the operational spectrum of the internal combustion engine by saving digitally two or more different sets of switching profiles (parameters). For supplying measured values to the control unit 15 of the internal combustion engine 11, the exhaust gas manifold 12 has an exhaust gas pressure gauge 16, each one of the four separately guided charge air flows 17, 18, 19, and 20 has a charge air pressure gauge 21, the combustion engine 11 has a tachometer 22, and the accelerator of the internal combustion engine 11 has a travel measuring device 23.

The drawing illustrates among other things the basic principle of the turbocharged device in which a pair configuration of two further exhaust gas turbochargers A2 and B2, identical to the first set of exhaust gas turbochargers A1 and B1, is provided for a refined sequential actuation of the charge air supply of the internal combustion engine 11. These turbochargers A2 and B2 of the second pair configuration are correlated with an interior portion of the charge air distributor 25 separated by a charge air separation flap 24. In this smallest embodiment of the turbocharged device the control unit 15 provided for the sequential actuation of the charge air supply of the internal combustion engine 11 is designed for opening the exhaust gas switch valve 14 of the second exhaust gas turbocharger B1 of the first pair configuration A1 and B1 before subsequently closing the charge air separation flap 24. When the closing signal is sent by the control device 15 to the actuating device 26 of the charge air separation flap 24, a respective opening signal is sent to the exhaust gas switch valve 14 of the second small exhaust gas turbocharger A2 and to the charge air switch valve 27 in the second charge air flow 18.

The four separate charge air flows 17, 18, 19, and 20 are realized in that, for a further refinement of the sequential switching of the charge air supply of the internal combustion engine 11, a second charge air distributor 29, which is dividable by a charge air separation flap 28 and is connected to a configuration of four additional exhaust gas turbochargers A3, B3, A4, and B4 arranged identical to the above disclosed first configuration of four turbochargers is provided. The charge air distributor 29 is connected to second inlet valves 31 of the cylinder 10 of the internal combustion engine 11 which are separate from the inlet valves 30 for the first charge air distributor 25. In this embodiment of the turbocharging device the control unit 15 for sequentially switching the charge air supply of the internal combustion engine 11 is configured such that with increased exhaust gas volume opening of the exhaust gas switch valves 14 of the last exhaust gas turbocharger B2 of the first configuration of four turbochargers A1, B1, A2, B2 occurs before subsequently the second charge air distributor 29 is activated. The closing signal sent to the actuating device 32 of the charge air separation flap 28 of the second charge air distributor 29 by the control unit 15 is coupled with an opening signal sent to the exhaust gas switch valve 14 of the fourth small exhaust gas turbocharger A4 and to the charge air switch valve 27 in the fourth charge air flow 20.

The first actuation of the second charge air distributor 29 takes place when the control unit 15 sends an opening signal to the charge air switch valve 27 in the third charge air flow 19 in combination with an opening signal to the exhaust gas switch valve 14 of the third small exhaust gas turbocharger A3.

Furthermore, in this case a switch signal is sent to the common actuator drive 33 for the four shutoff valves 34 positioned between the second charge air distributor 29 and the second inlet valves 31 of the four cylinders 10 of the internal combustion engine 11. While the inlet valves 30 and 31 preferably open in synchronized movement with the cam shaft, the valves 34 are coupled to the switching function of the exhaust gas turbocharger A3. In this way it is possible to prevent to a much greater extent losses of charge air from the first inlet valves 30 via the second inlet valves 31.

The drawing also shows an embodiment of the turbocharging device in which each of the serially connected compressor arrangements 35 and 36 comprises a third compressor 37 of a third exhaust gas turbocharger C upstream of the compressor 36 of the larger exhaust gas turbocharger B. Its turbine 13 is connected to the turbines 13 of the other two exhaust gas turbochargers A and B in a parallel arrangement. With respect to the airflow to be conveyed, the turbocharger C is larger than the exhaust gas turbocharger. Preferably, the control unit 15 for sequentially actuating the charge air supply of the internal combustion engine 11 is designed such that, with increasing exhaust gas volume, opening of the exhaust gas switch valves 14 of the third exhaust gas turbocharger C of the first, second, or third group of three exhaust gas turbochargers A, B, C is performed first, and, subsequently, the exhaust gas switch valve 14 of the smallest exhaust gas turbocharger A of the subsequently arranged group of three exhaust gas turbochargers A, B, C takes place. Accordingly, when activating the charge air supply for supplying the internal combustion engine 11 in a step wise manner, each one of the charge air flows 17, 18, and 19 is fully employed before the next charge air flow 18 or 19 or 20 is being used. When reducing the charge air supply of the internal combustion engine 11, the reverse sequence is observed. The transition from the four pair configurations of exhaust gas turbochargers A and B to four groups of three of exhaust gas turbochargers C, B, and A, decreasing in volume in the direction toward the engine, realizes one of the three combined measures for increasing the number of exhaust gas turbochargers and thus a refined division of the operational spectrum of the internal combustion engine 11 into a chain of operational ranges with different charge air supply. Furthermore, the arrangements of three exhaust gas turbochargers C, B, and A with decreasing volumes in the direction toward the motor allow to take advantage of the relative increase of the geometric mechanical compression within the cylinders 10 of the internal combustion engine 11 to an even greater extent.

The specification incorporates by reference the disclosure of German priority document 198 56 960.2 of Dec. 10, 1998.

The present invention is, of course, in no way restricted to the specific disclosure of the specification and drawings, but also encompasses any modifications within the scope of the appended claims.

What is claimed is:

1. A turbocharging device for an internal combustion engine, said turbocharging device comprising:

an exhaust gas manifold configured to receive exhaust gas from an internal combustion engine;

a first charge air distributor configured to distribute charge air to the internal combustion engine;

a first pair of exhaust gas turbochargers comprising first and second exhaust gas turbochargers each having a turbine and a compressor, wherein said turbines of said exhaust gas turbochargers of said first pair are connected in parallel to said exhaust gas manifold and wherein said compressors of said exhaust gas turbochargers of said first pair are connected serially to said first charge air distributor;

a second pair of exhaust gas turbochargers comprising first and second exhaust gas turbochargers each having a turbine and a compressor, wherein said turbines of said exhaust gas turbochargers of said second pair are connected in parallel to said exhaust gas manifold and wherein said compressors of said exhaust gas turbochargers of said second pair are connected serially to said first charge air distributor;

a first one of said exhaust gas turbochargers of said first pair being operated alone when the need for charge air is minimal and a second one of said exhaust gas turbochargers of said first pair being switched on when the need for charge air increases, wherein an air volume of said second exhaust gas turbocharger of said first pair is greater than an air volume of said first exhaust gas turbocharger of said first pair, wherein an air volume of said second exhaust gas turbocharger of said second pair is greater than an air volume of said first exhaust gas turbocharger of said second pair;

said compressor of said first exhaust gas turbocharger of said first pair is positioned, relative to the fluid flow, between said compressor of said second exhaust gas turbocharger of said first pair and said first charge air distributor;

said compressor of said first exhaust gas turbocharger of said second pair is positioned, relative to the fluid flow, between said compressor of said second exhaust gas turbocharger of said second pair and said first charge air distributor;

said change air distributor having a charge air separation flap configured to divide in a closed position an interior of said charge air distributor into a first interior portion and a second interior portion, wherein said compressor of said first exhaust gas turbocharger of said second pair is connected to said second interior portion of said charge air distributor.

2. A turbocharging device according to claim 1, comprising a control unit configured to control a stepwise charge air supply to the internal combustion engine, wherein said turbine of said second exhaust gas turbocharger of said first pair has an exhaust gas switch valve and wherein said control unit is configured to first open said exhaust gas switch valve and subsequently close said charge air separation flap when the exhaust gas amount increases.

3. A turbocharging device according to claim 1, further comprising:
- a second charge air distributor configured to distribute charge air to the internal combustion engine and having a charge air separation flap configured to divide in a closed position an interior of said second charge air distributor into a first interior position and a second interior position;
- a third pair of exhaust gas turbochargers comprising first and second exhaust gas turbochargers each having a turbine and a compressor, wherein said turbines of said exhaust gas turbochargers of said third pair are connected in parallel to said exhaust gas manifold and wherein said compressors of said exhaust gas turbochargers of said third pair are connected serially to said second charge air distributor;
- a fourth pair of exhaust gas turbochargers comprising first and second exhaust gas turbochargers each having a turbine and a compressor, wherein said turbines of said exhaust gas turbochargers of said fourth pair are connected in parallel to said exhaust gas manifold and wherein said compressors of said exhaust gas turbochargers of said fourth pair are connected serially to said second charge air distributor;
- wherein said first charge air distributor is connected to first inlet valves of the internal combustion engine and said second charge air distributor has a closeable connection to second inlet valves of the internal combustion engine.

4. A turbocharging device according to claim 3, wherein said turbine of said second exhaust gas turbocharger of said second pair has an exhaust gas switch valve and wherein said control unit is configured to first open said exhaust gas switch valve of said second exhaust gas turbocharger of said second pair and subsequently open said closeable connection of said second charge air distributor when the exhaust gas amount increases.

5. A turbocharging device according to claim 3, wherein each one of said first, second, third, and fourth pairs has a third exhaust gas turbocharger comprised of a compressor and a turbine, wherein in each one of said first, second, third, and fourth pairs said compressor of said third exhaust gas turbocharger is serially connected upstream of said compressor of said second exhaust gas turbocharger, wherein in each one of said first, second, third, and fourth pairs said turbine of said third exhaust gas turbocharger is parallel connected to said turbines of said first and second exhaust gas turbochargers, wherein in each one of said first, second, third, and fourth pairs an air volume of said third exhaust gas turbochargers is greater than the air volume of said second exhaust gas turbocharger.

6. A turbocharging device according to claim 5, wherein said third exhaust gas turbocharger of each one of said first, second, third, and fourth pairs has an exhaust gas switch valve, wherein said first exhaust gas turbocharger of each one of said second, third, and fourth pairs has an exhaust gas switch valve, wherein said control unit is configured to sequentially open said exhaust gas switch valve of said third exhaust gas turbocharger of said first, second, and third pairs before opening said switch valve of said first exhaust gas turbocharger of said second, third, and fourth pairs, respectively.

7. A turbocharging device according to claim 1, wherein each one of said first and second pairs has a third exhaust gas turbocharger comprised of a compressor and a turbine, wherein in each one of said first and second pairs said compressor of said third exhaust gas turbocharger is serially connected upstream of said compressor of said second exhaust gas turbocharger, wherein in each one of said first and second pairs said turbine of said third exhaust gas turbocharger is parallel connected to said turbines of said first and second exhaust gas turbochargers, wherein in each one of said first and second sets an air volume of said third exhaust gas turbochargers is greater than the air volume of said second exhaust gas turbocharger.

8. A turbocharging device according to claim 7, wherein said third exhaust gas turbocharger of each one of said first and second pairs has an exhaust gas switch valve, wherein said first exhaust gas turbocharger of said second pair has an exhaust gas switch valve, wherein said control unit is configured to sequentially open said exhaust gas switch valve of said third exhaust gas turbocharger of said first pair before opening said switch valve of said first exhaust gas turbocharger of said second pair.

9. A turbocharging device according to claim 1, wherein said control unit comprises a computer configured to compare measured operating parameters of said turbocharging device and of the internal combustion engine with digital switching data stored in said computer.

10. A turbocharging device according to claim 9, wherein said operating parameters are exhaust gas pressure, charge air pressure, engine rpm, and engine load values.

* * * * *